United States Patent Office.

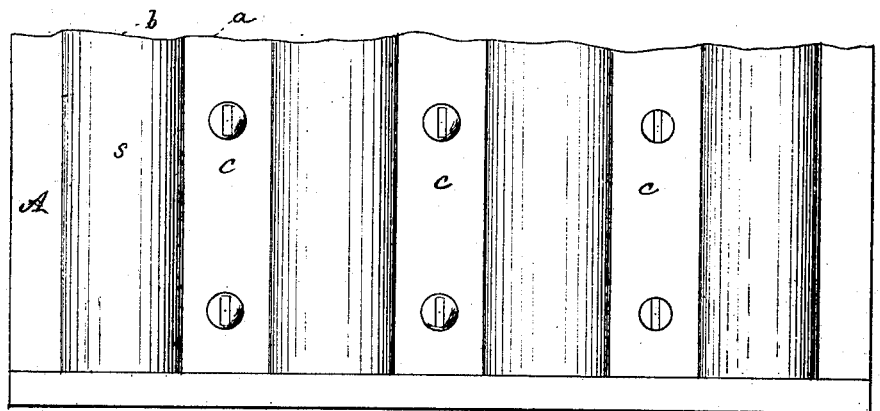
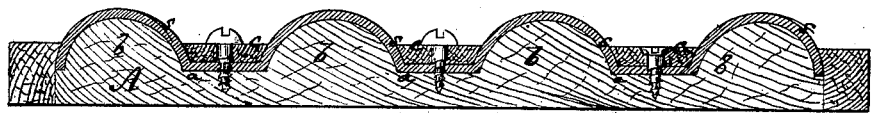
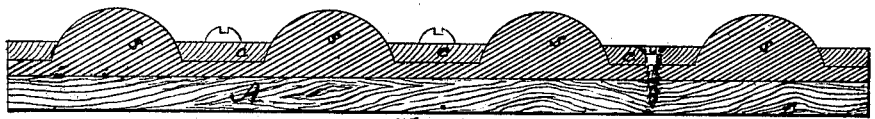
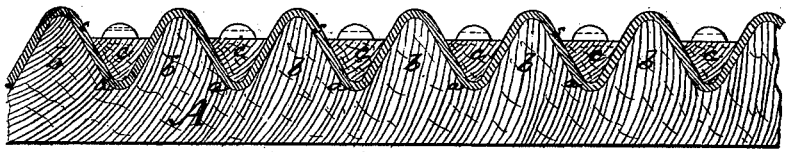

PETER W. NEEFUS, OF NEW YORK, N. Y.

Letters Patent No. 112,168, dated February 28, 1871.

IMPROVEMENT IN STAIR AND FLOOR-PLATES.

The Schedule referred to in these Letters Patent and making part of the same.

Be it known that I, PETER W. NEEFUS, of the city, county, and State of New York, have invented a new and improved Stair and Floor-Plate; and I do hereby declare that the following is a full, clear, and exact description of the same, reference being had to the accompanying drawing making part of this specification.

This invention is an improvement upon that kind of stair or floor-plate in which a series of elastic ridges or projections, which furnish a secure and noiseless foothold, is secured to a stair or floor, or to a plate lying thereon, by pieces or plates of wood or metal.

The invention consists of a sheet of elastic material arranged in alternating ridges and grooves, combined with holding strips of wood or metal, arranged in the depressions, and secured by screws or equivalents passing through the sheet of elastic material to the structure beneath.

In the drawing—

Figure 1 is a top view of a stair-plate constructed in accordance with my invention.

Figure 2 is a vertical transverse section of the same.

Figures 3 and 4 are views similar to fig. 2, showing different methods of construction.

A designates the stair or floor-plate, which can be made of either wood or metal.

In the most approved method of construction, the top of plate A is molded into a series of grooves, $a$, and ridges $b$, of any desired shaped section, such, for instance, as ridges with rounded crests, as shown in fig. 2, or of V-shaped section, as shown in fig. 3; or the ridges may be formed by attaching to the plate A moldings of semicircular, triangular, or other desired shape The projections $b$ and depressions $a$, on the surface of the plate A, are covered, in the preferable method of construction, by a sheet of vulcanized India rubber, or other elastic material, $s$, which is secured in place by strips $c$, of wood or metal, which lie over the rubber in the grooves.

The thickness of the pieces or strips $c$ is made less than the height of the ridges.

The strips are secured to the plate underneath the rubber by screws, nails, or their equivalents, passing through the rubber sheet.

These nails may be cast or otherwise fastened to the under surfaces of the strips $c$.

When screws are used, they may have rounded heads for ornament, or countersunk heads to give greater facility for cleaning the plates.

This improvement has the advantages that a surface is provided on which the feet can tread without noise or danger of slipping, and the sheet of rubber is held securely at contiguous points, and is thus protected from injury other than that due to ordinary wear.

The rubber can also be replaced readily when worn, and no special molds are required to make the rubber sheets.

Fig. 4 shows a modification of the improvements in which a sheet of rubber is constructed with ridges and grooves, and secured in place by strips $c$, in the manner before described.

This plan can be readily applied to a stair or floor without a separate plate, and, in any case, moldings may be laid directly upon a stair or floor and a sheet of rubber secured over them by strips, in the manner before described.

It is evident that the ridges need not be parallel, but may be arranged, in respect, to each other, so as to form a pattern or figure.

I claim as new and desire to secure by Letters Patent—

A sheet of elastic material, $s$, arranged in alternating ridges and grooves, and combined with strips $c$ in the depressions, substantially in the manner and for the purposes specified.

PETER W. NEEFUS.

Witnesses:
CHAS. E. EMERY,
W. H. WEIGHTMAN.